United States Patent [19]

Gardner

[11] 4,097,749

[45] Jun. 27, 1978

[54] FOURIER POWER SPECTRA OF OPTICAL IMAGES USING CCD'S

[75] Inventor: Keith L. Gardner, Ridgecrest, Calif.

[73] Assignee: The United States of America as represented by the Secretary of the Navy, Washington, D.C.

[21] Appl. No.: 757,429

[22] Filed: Jan. 6, 1977

[51] Int. Cl.² .............. G02B 27/38

[52] U.S. Cl. .............. 250/550; 350/162 SF

[58] Field of Search .............. 250/550; 324/77 K; 350/162 SF

[56] References Cited

U.S. PATENT DOCUMENTS

| | | | |
|---|---|---|---|
| 3,052,843 | 9/1962 | Hurvitz | 324/77 K |
| 3,937,942 | 2/1976 | Bromley et al. | 324/77 K |
| 3,942,109 | 3/1976 | Crumly et al. | 324/77 K |
| 3,971,065 | 7/1976 | Bayer | 350/162 SF |

*Primary Examiner*—David C. Nelms

*Attorney, Agent, or Firm*—R. S. Sciascia; Roy Miller

[57] ABSTRACT

Direct spatial Fourier power spectra of optical images are obtained by manipulating either the image focused onto a photosensitive charge coupled device (CCD) or the readout from the CCD.

5 Claims, 2 Drawing Figures

FOURIER POWER SPECTRA OF OPTICAL IMAGES USING CCD'S

BACKGROUND OF THE INVENTION

This invention relates to optical image processing whereby a pattern of light intensity is electrically converted by a Fourier transformation from an amplitude spatial function to an amplitude frequency function. The advantages of processing a Fourier transform are well known. The sampling theorems allow one to minimize the collection of data. The space and frequency shifting theorems allow one to shift image position and size. Computer programs for fast Fourier transforms have been developed, allowing broadcasting of telemetry information in the form of transforms.

Fourier transformation is basically a mathematical process in which a non periodic amplitude-time function, that is, a complex wave form, is broken down into a series of sine wave components of all frequencies which make up the complex wave form. The amplitude-time is multiplied by a sinusoidal function and the product is integrated. The frequency and phase of the multiplying function determines the value of the integral, which is proportional to the amplitude of the spectrum component of that particular frequency and phase. To obtain the total frequency spectrum of the complex wave form, the frequency of the multiplying sinusoidal function must be varied over the respective band while the phase must be adjusted for maximum amplitude at each frequency. Since there are an infinite number of discrete frequency components in most complex waves, there would be an infinite number of terms; as a partical matter, the Fourier integral is evaluated at discrete frequencies so as to obtain a realistic picture of the amplitude frequency function.

The Fourier power spectrum is equal to the square of the individual terms in the Fourier series. The Fourier power spectrum contains essentially the same information as the Fourier series, except that the negative sign of a series frequency component is lost when the turn is squared.

Devices for the transformation of electrical pulses often use optical components to process the signal.

For instance interference fringes produced by two coherent light beams may be intensity modulated in accordance with an input signal and phase modulated with a systematic signal. The interference pattern is then measured with a photoelectric cell, to yield the transform of the input signal. Other devices use an input signal to vary the position of an arbitrary optical image on a film, which is then rapidly processed and read out as a transform. On the other hand, the present invention concerns a device which uses electrical components to obtain a power spectrum, which is related to a transform of an optical signal as explained below.

Recent developments in surface wave technology have produced a family of devices known as Direct Electronic Fourier Transform (DEFT) devices. They are described by Philipp Kornreich et al. in *Proceedings Of The IEEE,* Vol. 62, No. 8, pp 1072 (August 1974). Basically, light falling on a "photocathode film" causes electron emission by the photoelectric effect. A transducer driven by a variable frequency generator sets up sound (strain) waves in the film. The strain waves modulate the electron emission. The photoelectrons are collected on an electrode and the collection potential between the electrodes is measured as the output. The film may be metal, or a semiconductor material. If a semiconductor is used the device relies on Elastophotoconductance rather than photoelectric effects, and output is measured across the semiconductor. The output is proportional to the light intensity and the strain. By varying the strain frequency, a Fourier transform of the light intensity is obtained.

Certain mechanical problems are inherent in the use of strain wave modulation, however, such as a limited dynamic range, control of propagation time, etc. These problems are not associated with a new type of semiconductor device known as a charge coupled device (CCD). Such devices are described more fully below, and still more fully by Gilbert F. Amelio in *Scientific American,* volume 230, page 22 (February 1974), and is U.S. Pat. No. 3,930,255, which description are hereby incorporated in and made a part of the present specification. Such devices are essentially a grid of cells (frequently photosensitive) which can store and read out a charge at a rate proportional to a read out or "clock" voltage. They have heretofor been contemplated for use as memory devices or visual image sensors as for t.v. cameras.

SUMMARY OF THE INVENTION

An optical image is forcused through an electro-optical modulator onto a charge coupled device (CCD) having an array of photosensitive elements. By varying either the readout frequency of the CCD or the electro-optical modulation frequency, a modulated output is obtained whose amplitude is proportional to the spatial Fourier transform of the optical image.

DESCRIPTION OF THE PREFERRED EMBODIMENT

The charge coupled device (CCD) is a relatively new concept in semiconductor electronics. Charge coupling refers to the transfer of a mobile electric charge within a semiconductor storage element to a similar, adjacent storage element by the external manipulation of voltages. Devices containing a 100 by 100 grid of storage elements have been manufactured on a silicon chip measuring only 0.12 by 0.15 inch. The device typically has a "*p* type" silicon substrate selectively altered to form an "*n* type" silicon layer with a silicon dioxide insulating layer on its surface. An array of electrodes is deposited on the surface of the insulating material and connected in two or more circuits so that they may be sequentially charged. When a periodic waveform called a "clock voltage " is applied to the electrodes, some of the electrons in the vicinity of each electrode will form a discrete packet of charge and move from one element to the next for each clock cycle. The electrons are said to move from one element to the next by displacement of the local "potential well".

A signal can be put into the silicon substrate at one point on the CCD and by turning over adjacent electrodes with the clock voltage, the signal can be transferred along a so-called "channel" to an output at another point on the CCD. The signal transfer from input to output is called the scan, which can be designed to operate in one, or several, directions and across the surface of the device.

The silicon in CCD's is very sensitive to light and generates mobile electrons through the Einstein photoelectric effect. This "electro-optic" creation of electrons is proportional to the intensity of the incident light and represents an input signal which by displacement of the potential well to an output which will carry a signal representative of the light pattern.

A simple image sensor can be envisioned in which an input signal is generated by photoelectrons in the vicinity of each electrode; a pattern of photoelectrons is then carried by the clock voltage to an output connection at the end of the channel. A variety of more complex practical image sensors, are available, but they all work on this basic principle. The operation is somewhat similar to an analog computer in that a series of discrete charge packages are stored then read out.

The input signal appears at the output after a delay caused by the time required to shift the charge packages through the channel. This delay is equal to the number of electrode regions to be read divided by the clock period.

CCD's are also capable of storing charges for a time before being read out. Such features may be employed herein, if desired.

Figure 1:
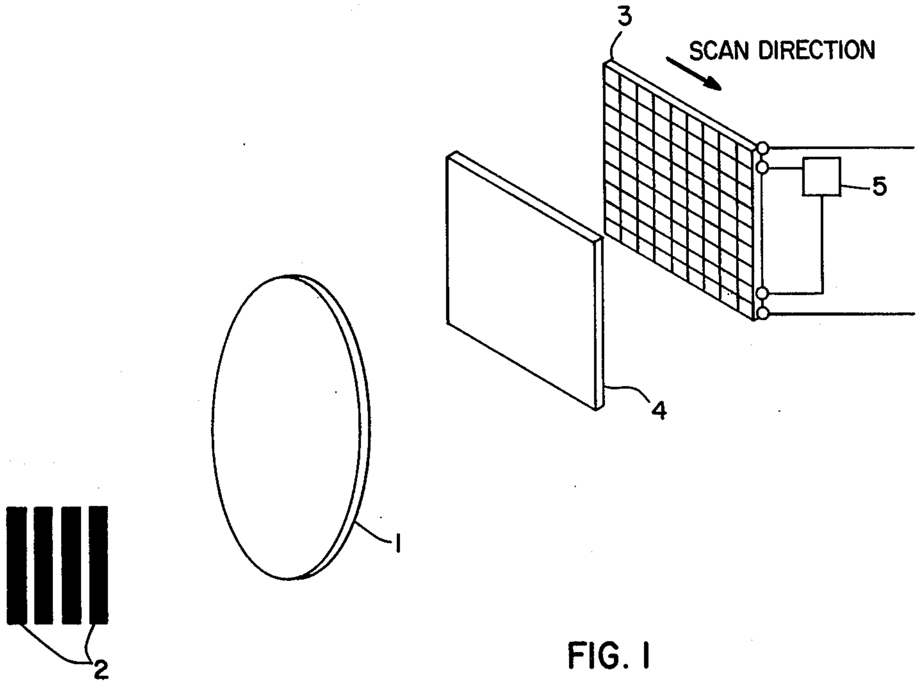
FIG. 1 is a schematic representation of the elements of the present invention.

Referring now to FIG. 1, a lens 1 serves to focus an image 2 onto a CCD array 3 through an electro-optical modulator 4.

The electro-optic modulator in various forms is well known in the field of optics, being frequently used to modulate lasers. A typical electro-optical modulator is a Pockels cell which employs a pair of parallel polarizers on either side of a suitable birefringent material to which an electrical field is applied. This changes the birefringence which in turn changes the polarization form of the light and its degree of passage through the second polarizer. Thus, a variable field applied to the birefringent material will modulate optical transmission through the device. Other electro-optical devices such as PLZT cells or an acousto-optical cell may be employed for purposes of the present invention within recognized engineering trade-off considerations.

Figure 2:
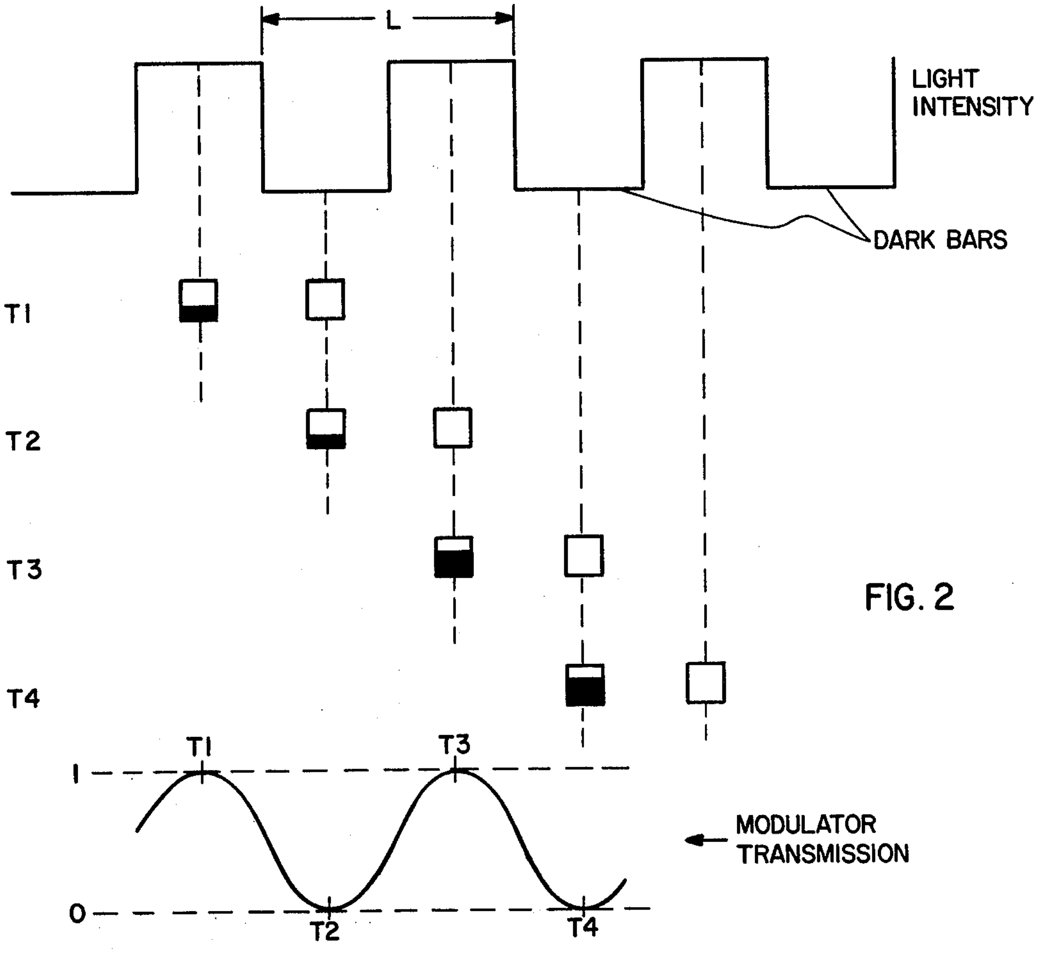
FIG. 2 is a diagramatic illustration of the operation of the device.

The modulator 4 is driven with a constant frequency sine wave, thus turning the image at the CCD 3 at frequency fm. By way of example, optical image 2 is a bright field with four periodic dark bars in the center. If CCD 3 is scanned with clock driver 5 charge "buckets" will travel across the CCD surface, collecting charge in the form of photoelectrons as they go. If dark bar center to center separation of image 2 is L and scan velocity is $V_B$, the modulation frequency, $f_m$, equals $V_B/L$. Two adjacent charge buckets being clocked across the CCD cells will collect electrons as shown in FIG. 2. Note that the second bucket sees either O modulator transmission or a dark bar and thus collects very little photoelectric charge.

It can be seen that, for this situation, some "buckets" will fill more rapidly with photocurrent charge than others. A modulated output will be observed as the CCD is scanned. By changing either the optical modulation or the clock frequency, the amplitude of the output modulation will decrease, since the necessary synchronization will be destroyed.

If we place an arbitrary optical image on the CCD and a vary either the electro-optical modulation frequency or the CCD clock frequency, a modulated output will be observed only at frequencies for which an optical spatial frequency (S.F.) obeys the relation $$S.F. = V_B/F_m.$$

A plot of output modulation amplitude versus S.F. will be proportional to the square of the bandlimited spatial Fourier transform of the optical image, along the direction of the CCD scan.

A consideration of the operation of the CCD and the modulator transmission curve show in FIG. 2 makes it apparent that the present device cannot measure negative components of a signal. For this reason, the devices in its present embodiment, fields the Fourier power spectrum of the input signal. A two dimensional Fourier transform could be obtained by: (1) employing several CCD arrays oriented along different directions, (2) rotating either the image or the arrary, or (3) designing a special CCD array capable of scanning in several directions.

What is claimed is:

1. A direct optical Fourier analysis system comprising:

a focusing device for producing an optical image of an optical input along an optical axis, an electro-optical modulation device following the focusing device on the optical axis for varying the input signal at variable controllable intervals;

a two-dimensional charge coupled device following the modulating device along the same optical axis with a multiplicity of photo sensitive elements included therein a clock driver for scanning the charge coupled device as a means for detecting and processing the modulated signal and producing a Fourier power spectra output.

2. The apparatus of claim 1 wherein;

said modulation device is a Pockels cell.

3. The apparatus of claim 1 wherein;

said photo sensitive elements are arranged in a two-dimensional rectangular array on a charged coupled device.

4. The apparatus of claim 1 wherein;

said charge coupled device is capable of scanning in several directions so that a two-dimensional Fourier power spectra is obtained as the output from said device.

5. A method for producing a Fourier power spectra as output from an optical image input, comprising the steps of;

focusing the input through a modulator cell so as to fall on a charge coupled device, modulating the input, detecting and storing the input on said charge coupled device; (having a plurality of photo sensitive photo electric storage elements) reading out the stored photo energy at a variable rate, conducting a signal carried by said photo energy to said output.

* * * * *